United States Patent
Wan

(10) Patent No.: US 7,808,373 B2
(45) Date of Patent: Oct. 5, 2010

(54) RECEPTOR OF TIRE PRESSURE MONITORING SYSTEM FOR VEHICLES

(76) Inventor: Tian Bao Wan, No. 17, Alley 92, Lane 189, Sec. 1, Anjhong Rd., Annan District, Tainan City (TW) 709

( * ) Notice: Subject to any disclaimer, the term of this patent is extended or adjusted under 35 U.S.C. 154(b) by 751 days.

(21) Appl. No.: 11/647,978

(22) Filed: Jan. 3, 2007

(65) Prior Publication Data

US 2008/0157953 A1   Jul. 3, 2008

(51) Int. Cl.
*B60C 23/02* (2006.01)

(52) U.S. Cl. ............... 340/442; 340/447; 340/539.1; 73/146.5

(58) Field of Classification Search ........... 340/442, 340/447, 539.1, 825.69, 825.72, 426.25, 340/426.28, 426.33; 73/146.2, 146.5
See application file for complete search history.

(56) References Cited

U.S. PATENT DOCUMENTS

| | | | |
|---|---|---|---|
| 6,505,507 B1 * | 1/2003 | Imao et al. | 73/146.5 |
| 6,507,276 B1 * | 1/2003 | Young et al. | 340/447 |
| 6,535,116 B1 * | 3/2003 | Zhou | 340/447 |
| 7,084,749 B1 * | 8/2006 | Honeck et al. | 340/445 |
| 7,212,106 B2 * | 5/2007 | Katou | 340/447 |

* cited by examiner

*Primary Examiner*—Hung T. Nguyen

(57) ABSTRACT

The present invention relates to a receptor of tire pressure monitoring system for vehicles. The receptor consists of a wiring substrate board of which is equipped with a radio-frequency receptor, a micro controller, a liquid crystal display, a vibration monitor and a buzzer. The vibration monitor could sense the vibration while the door is being opened or closed and hence start the tire pressure monitoring system. The radio-frequency receptor can receive the data and convert it to be shown on the liquid crystal display. While the tire pressure is unusual, the buzzer starts the audio alerting sound to remind the driver checking the tires. It can improve safety driving.

1 Claim, 3 Drawing Sheets

RECEPTOR OF TIRE PRESSURE MONITORING SYSTEM FOR VEHICLES

BACKGROUND OF THE INVENTION

1. Field of the Invention

The present invention relates to a receptor of tire pressure monitoring system for vehicles where the dry battery is used for providing the power. The receptor consists of a wiring substrate board which is equipped with a radio-frequency receptor, a micro controller, a liquid crystal display, a vibration monitor and a buzzer. The vibration monitor can sense the vibration while the door is opened or closed and hence start the tire pressure monitoring system. The radio-frequency receptor is controlled by the micro controller while receiving the data and converting it to be shown on the liquid crystal display. While the tire pressure is unusual, the buzzer starts the audio alerting sound to remind the driver checking tires. It can improve safety driving.

2. Description of the Prior Art

The prior invention of the tire pressure monitoring system consists of a power wire connecting to the lead battery of the car engine. The wire routing construction is complicated and hence increase the labor cost.

DETAILED DESCRIPTION OF THE INVENTION

Figure 1:
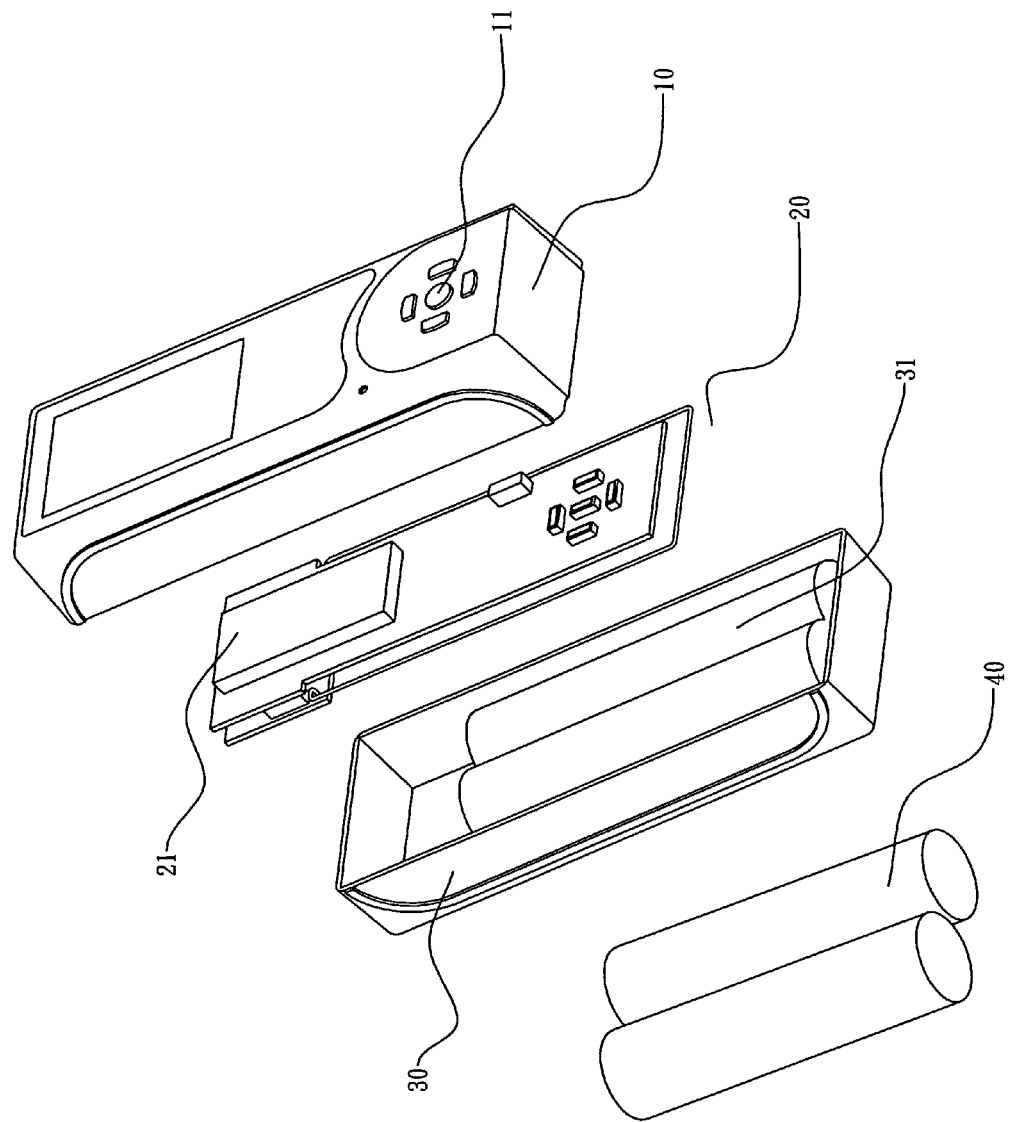
FIG. 1 is a dissected drawing of the present invention.
Figure 2:
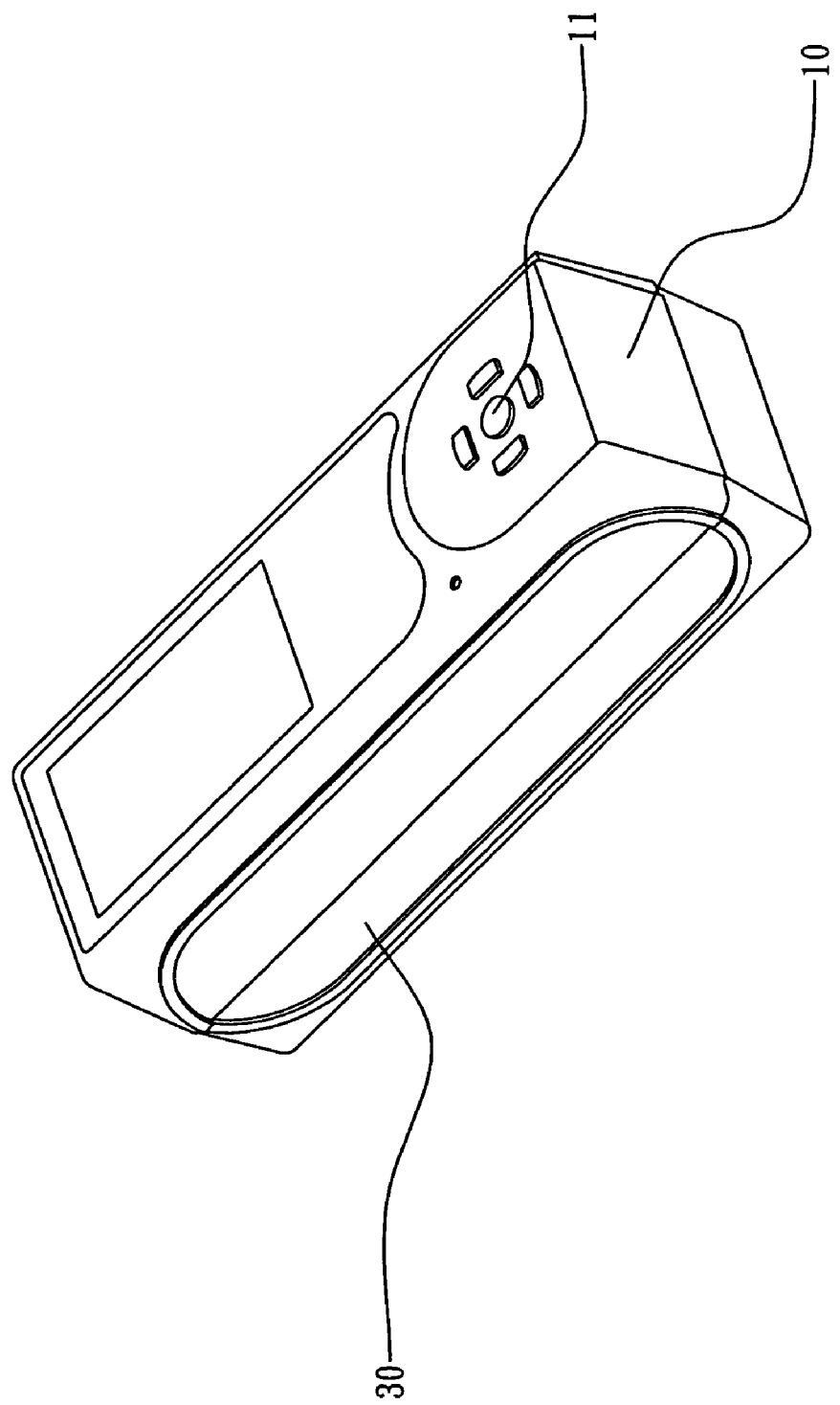
FIG. 2 is a three dimensional drawing of the present invention.
Figure 3:
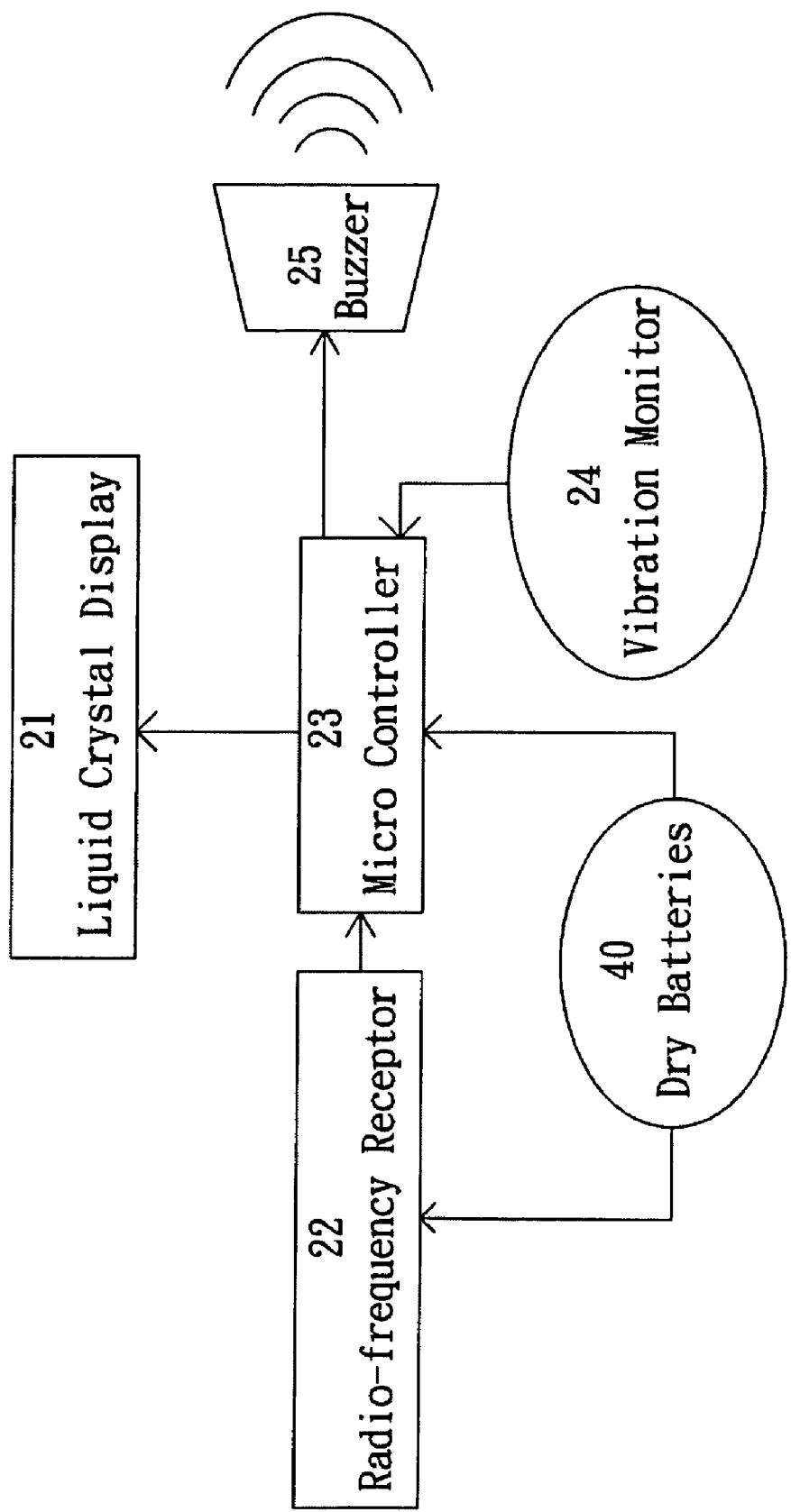
FIG. 3 is a work flow chart of the present invention.

Referring to FIGS. 1, 2 and 3, the receptor of tire pressure monitoring system includes operating buttons (11) on an upper package surface of the receptor (10). The wiring substrate board (20) is equipped with a radio-frequency receptor (22), a micro controller (23), a liquid crystal display (21), a vibration monitor (24) and a buzzer (25). The battery container (31) is set inside of a lower package surface of the receptor (30) for storing dry batteries (40) to provide power.

The external wire of the wiring substrate board (20) is being connected to the battery container (31) and then being set inside of the lower package of the receptor (30). The lower package of the receptor (30) is being fastened with the upper package of the receptor (10). Finally, the dry batteries (40) are set inside of the battery container (31).

The vibration monitor (24) can sense the vibration while the doors are being opened or closed by the driver and start the receptor of the monitoring system. The micro controller (23) enables the radio-frequency receptor (22) to receive data and covert it to show on the liquid crystal display (21). The operating buttons (11) are used to control the displaying items shown on the liquid crystal display (21). While the tire pressure is unusual, the receptor will make the alerting audio sound through the buzzer (25).

The aforementioned mechanism of the present invention has provided a more successful product due to the following two reasons:

First, the dry battery (40) is used for providing power without any external wire, and it is convenient for replacement.

Second, the vibration monitor (24) can automatically sense the vibration while the door is being opened or closed and hence start the receptor of the tire pressure monitoring system. This improves safety driving and makes it more convenient.

The invention claimed is:

1. A receptor of tire pressure monitoring system for vehicles consists of the operating buttons on an upper package surface of the receptor and a wire substrate board which is equipped with a radio-frequency receptor, a micro controller, a set of liquid crystal display and a buzzer, a battery container is set inside of a lower package of the receptor for storing dry batteries to provide power, the receptor of tire pressure monitoring system for vehicles consists of a vibration monitor set on the wire substrate board, the vibration monitor can sense the vibration while the door is being opened or closed and hence start the receptor of the tire pressure monitoring system.

* * * * *